(12) United States Patent
Böckem et al.

(10) Patent No.: US 11,493,599 B2
(45) Date of Patent: Nov. 8, 2022

(54) 3D SURVEILLANCE SYSTEM COMPRISING LIDAR AND MULTISPECTRAL IMAGING FOR OBJECT CLASSIFICATION

(71) Applicant: LEICA GEOSYSTEMS AG, Heerbrugg (CH)

(72) Inventors: Burkhard Böckem, Jonen AG (CH); Jürgen Dold, Sempach (CH); Klaus Bereuter, Alberschwende (AT); Simon Mark, Thal (CH); Matthias Wieser, Wendlingen (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 407 days.

(21) Appl. No.: 16/704,249

(22) Filed: Dec. 5, 2019

(65) Prior Publication Data

US 2020/0200872 A1   Jun. 25, 2020

(30) Foreign Application Priority Data

Dec. 21, 2018   (EP) ..................................... 18215672

(51) Int. Cl.
*G01S 7/48* (2006.01)
*G06T 7/10* (2017.01)
(Continued)

(52) U.S. Cl.
CPC .......... *G01S 7/4802* (2013.01); *G01S 7/4813* (2013.01); *G01S 7/51* (2013.01); *G01S 17/42* (2013.01);
(Continued)

(58) Field of Classification Search
CPC ........ G01S 7/4802; G01S 7/4813; G01S 7/51; G01S 17/42; G01S 17/86; G01S 7/4817;
(Continued)

(56) References Cited

U.S. PATENT DOCUMENTS

| 9,383,753 | B1 | 7/2016 | Templeton et al. |
| 2012/0274466 | A1 | 11/2012 | Mezger |

(Continued)

FOREIGN PATENT DOCUMENTS

| EP | 2775257 A1 | 9/2014 |
| EP | 3306346 A1 | 4/2018 |

(Continued)

OTHER PUBLICATIONS

European Search Report dated Oct. 21, 2019 as received in Application No. 18215672.9.

(Continued)

*Primary Examiner* — Nam D Pham
(74) *Attorney, Agent, or Firm* — Maschoff Brennan

(57) ABSTRACT

A surveillance system for detecting an object within a monitored infrastructure and to a hybrid 3D surveying device, wherein a LiDAR device is configured that scanning is carried out with respect to two essentially orthogonal axes and wherein the LiDAR device comprises a cover mounted on the base, such that the base and the cover form an enclosure that encloses all moving parts of the LiDAR device, wherein the cover is configured to be opaque for visible light and translucent for the wavelength range of the LiDAR transmission radiation. The system further comprises a computing unit configured for processing the LiDAR measurement data to generate a 3D point cloud of the monitored infrastructure, and an object detector configured for classification of the object based on the 3D point cloud.

15 Claims, 4 Drawing Sheets

(51) Int. Cl.
G06T 7/521 (2017.01)
G06T 7/70 (2017.01)
G01S 17/86 (2020.01)
G01S 7/481 (2006.01)
G01S 7/51 (2006.01)
G01S 17/42 (2006.01)
G06T 7/60 (2017.01)
G06V 10/145 (2022.01)
G06V 20/13 (2022.01)

(52) U.S. Cl.
CPC .............. *G01S 17/86* (2020.01); *G06T 7/10* (2017.01); *G06T 7/521* (2017.01); *G06T 7/60* (2013.01); *G06T 7/70* (2017.01); *G06V 10/145* (2022.01); *G06V 20/13* (2022.01); *G06T 2207/10028* (2013.01)

(58) Field of Classification Search
CPC ...... G01S 17/89; G01S 7/4812; G01S 7/4808; G01S 17/58; G06T 7/10; G06T 7/521; G06T 7/60; G06T 7/70; G06T 2207/10028; G06V 10/145; G06V 20/13; G08B 13/181; G08B 13/19628; G08B 13/19693; G08B 13/19697; G08B 13/19613
See application file for complete search history.

(56) References Cited

U.S. PATENT DOCUMENTS

| | | | |
|---|---|---|---|
| 2014/0063489 A1 | 3/2014 | Steffey et al. | |
| 2014/0064555 A1 | 3/2014 | Sebastian et al. | |
| 2016/0061954 A1 | 3/2016 | Walsh et al. | |
| 2018/0136319 A1 | 5/2018 | Send et al. | |
| 2018/0284246 A1 | 10/2018 | LaChapelle | |
| 2018/0329066 A1 | 11/2018 | Pacala | |
| 2019/0250251 A1* | 8/2019 | Gibson | G01S 17/10 |

FOREIGN PATENT DOCUMENTS

| | | |
|---|---|---|
| JP | 2003060973 A | 2/2003 |
| JP | 2015213251 A | 11/2015 |
| JP | 2015535925 A | 12/2015 |
| JP | 2017208595 A | 11/2017 |
| JP | 2018513566 A | 5/2018 |
| JP | 2018119942 A | 8/2018 |
| WO | 2018071416 A1 | 4/2018 |

OTHER PUBLICATIONS

"Visualization of underground flood information using Laser Scanner", The 79th (Heisei 29) National Convention Proceedings (4), Information Processing Society of Japan, Makoto HIROSE et al., Mar. 16, 2017.

"Seqsense (KK)" Robotics Industry Frontline 2019 [ISBN 978-4-88353-275-9], Oct. 9, 2018.

"Laser-visual-inertial odometry and mapping with high robustness and low drift", Journal of Field Robotics, Zhang, J. at al., Aug. 23, 2018.

* cited by examiner

3D SURVEILLANCE SYSTEM COMPRISING LIDAR AND MULTISPECTRAL IMAGING FOR OBJECT CLASSIFICATION

CROSS-REFERENCE TO RELATED APPLICATIONS

This application claims priority to European Patent Application No. 18215672.9, filed on Dec. 21, 2018. The foregoing patent application is herein incorporated by reference.

FIELD OF THE INVENTION

The present invention relates to a surveillance system for detecting an object within a monitored infrastructure, particularly a building or facility to be monitored, more particularly an area that is frequently exposed to people and/or vehicles passing through.

BACKGROUND

By way of example, surveillance systems according to the invention are used to monitor neuralgic points within a city, such as railway stations, airports, city parks, or otherwise busy public places. Furthermore, surveillance systems are used to monitor or safeguard restricted or dangerous areas, e.g. industrial plants, construction sites, or business complexes.

By way of another example, surveillance systems according to the invention are used to support operation of a facility, e.g. supervision of a warehouse or a car park.

Starting from an initially passive observation, i.e. the mere provision of a remote representation of a scene to be monitored by a human system operator, modern surveillance systems have increasingly evolved into active systems that can autonomously identify objects and/or situations related to the scene to be monitored, e.g. for automatically raising an alarm or for flagging a scene to be reviewed by a human operator.

Often, a distributed network of cameras is used, wherein live video streams of a number of cameras is displayed on a set of monitors and/or wherein different camera views are selectable by an operator of the surveillance system, e.g. the security personnel of a railway station or a business complex. Furthermore, modern systems may be configured for automatically identifying and tracking persons or otherwise moving objects, e.g. cars, in order to notify the operator of any suspicious movement.

In particular, the automatically generated tracking information is used to hand-off moving objects from one camera to another camera in case the moving object leaves the field of view of the first camera, i.e. the path of the object can be automatically followed within the distributed network of cameras.

In addition to displaying essentially unedited footage of the cameras and path information, surveying results are often embedded as live textures in an integrated 3D model of the environment such that a situation may be inspected from arbitrary perspectives, e.g. independent of the movement of a person or object.

Modern surveying systems often make use of a variety of different surveying sensors. For example, thermal cameras may be used for monitoring an infrastructure during night and/or for identifying objects or critical events based on temperature, e.g. for detecting fire outbreaks or the status of vehicle or other machine engines.

By way of another example, LiDAR (Light Detection And Ranging) devices and/or light barriers provide for intrusion and/or movement detection, wherein moving objects are detected as they cross observing planes within the infrastructure. However, compared to camera imaging spatial coverage by LiDAR devices and/or light barriers is often limited, e.g. wherein different observing planes are only placed at entrances, e.g. doors and windows, or wherein different observing planes are at least separated by several meters.

Particular problems of prior art surveying systems relate to the handling of changing environmental conditions such as changes in ambient light, and/or to adapting to modifications of the environment, wherein placement of allowed objects have to be distinguished from placement of disallowed objects within the infrastructure to be monitored.

Further requirements for a surveying system according to the invention relate to the size and visibility of the monitoring devices. On the one hand, the monitoring devices have to be configured, particularly by being small and light enough, to be mountable at a variety of different locations. On the other hand, the devices have to be concealed in order to avoid malicious attacks and/or manipulation by an intruder or any other person seeking to hamper the surveying.

Another particular problem of surveying relates to the detection of left behind objects within a surveillance area, e.g. packages containing explosives or other harmful substances. However, in prior art surveying systems automatic object identification and tracking often brakes down in the case of crowded areas, i.e. areas with many different kinds of objects, wherein all of these objects can move in different directions such that frequent crossings and line-of-sight blockings occur. For example, such conditions are present in railway or subway stations.

BRIEF DESCRIPTION OF THE INVENTION

It is an object of some embodiments of the present invention to provide an improved surveillance system which overcomes the deficiencies of state of the art systems.

At least parts of these objects are achieved by realizing the features of the independent claims. Features which further develop the invention in an alternative or advantageous manner are described in the dependent patent claims.

Some aspects of the invention relate to a surveillance system for detecting an object within a monitored infrastructure, particularly a building or facility to be monitored, more particularly an area that is frequently exposed to people and/or vehicles passing through. The surveillance system comprises a LiDAR device configured for carrying out a distance measurement by emitting transmission radiation and detecting returning parts of the transmission radiation, namely wherein measurement data generated by the LiDAR device are indicative of a propagation direction and the time-of-flight of a measurement signal carried by the transmission radiation. Furthermore, the surveillance system comprises an object detector configured for detecting an object within the monitored infrastructure based on measurement data of the LiDAR device.

The LiDAR device comprises a base, a support mounted on the base such that it is rotatable about a first rotational axis, a rotary body with a mirror surface, wherein the rotary body is mounted on the support such that it is rotatable about a second rotational axis being substantially orthogonal to the first rotational axis. The LiDAR device also has an angle determining unit configured for capturing an orientation of the support about the first rotational axis and of the rotary body about the second rotational axis, respectively.

Furthermore, the LiDAR device comprises a cover mounted on the base, the cover being opaque for visible light and translucent for the wavelength range of the transmission radiation, e.g. wherein the transmission radiation is emitted at an infrared wavelength range. The cover is in rest with respect to the base, and the base and the cover form a closed enclosure of the support and the rotary body. In other words, the base and the cover enclose all moving parts of the LiDAR device.

The LiDAR device is configured to generate the measurement data based on a measurement process comprising a rotation of the support about the first rotational axis, a rotation of the rotary body about the second rotational axis, and a transmission of the transmission radiation and a detection of at least parts of the transmission radiation returning via the mirror surface.

Thus, the LiDAR device is configured that both the target axis of the transmission radiation and the target axis of the returning parts of the transmission radiation (receiving radiation) are defined/rotated by the orientation of the rotary body.

For example, the LiDAR device may be configured that both the transmission radiation and the returning parts of the transmission radiation are deflected by the mirror surface. Alternatively, only the returning parts of the transmission radiation may be deflected by the mirror surface.

For example, the mirror surface is a plane mirror surface tilted with respect to the second rotational axis or a parabolic mirror surface.

The system also comprises a computing unit configured for generating a 3D point cloud of the monitored infrastructure based on the measurement data, and the object detector is configured for classification of the object based on the 3D point cloud, particularly based on 3D change detection.

Thanks to the LiDAR technology, the invention enables detection of any 3D change and object tracking under any light conditions, e.g. under bright back light and in the darkness, while thanks to the cover the LiDAR arrangement details about the used 3D surveilling technology are concealed for a human observer. Therefore, the inventive surveilling system provides discreet and noiseless 3D surveying invisible to the eye.

Moreover, thanks to the LiDAR technology and the 3D-based object classification the sensitivity and spatial resolution for object detection and object recognition is increased and, for example, objects having dimensions at the centimeter range or even smaller can be unambiguously detected and identified, e.g. small left behind electronic devices such as smartphones or tablets.

By the swiveling of the target axis about two essentially orthogonal axes an essentially all-around field of view can be achieved. Thus, the number as well as the area or volume of spatial blind spots are significantly minimized.

For example, the LiDAR device may be configured for providing a scanning field of view by the transmission radiation of 360 degrees about the first rotational axis and of at least 200 degrees about the second rotational axis, respectively, more particularly of 360 degrees about the first rotational axis and at least 250 degrees about the second rotational axis, respectively.

In a particular embodiment the LiDAR device is configured to provide for an updating of the 3D point cloud at an update rate of at least one sample point of the 3D point cloud per second per angular field of view of one degree in elevation by one degree in azimuth.

Therefore, the complete LiDAR field of view is monitored by the LiDAR device in essentially real time and an essentially real time representation of the monitored infrastructure can be displayed to a user based on the LiDAR measurement data. In particular, the fast updating of the 3D point cloud provides for improved change detection based on the LiDAR measurement data.

For example, the LiDAR device is configured that the transmission radiation is emitted as pulsed radiation with at least 100,000 pulses per second, particularly at least 400,000 pulses per second. In particular, the LiDAR device may be configured that the support rotates about the first rotational axis at a frequency of at least 0.2 Hz, particularly at a frequency between 0.5 Hz and 4 Hz, and that the rotary body rotates about the second rotational axis at a frequency of at least 20 Hz, particularly at a frequency between 50 Hz and 100 Hz.

In one embodiment, the LiDAR device comprises a wireless data and/or power interface configured for wireless data transfer, for wireless power transfer, or for wireless data and wireless power transfer, respectively, between the base and the support, e.g. for increasing reliability and durability of the LiDAR device by avoiding wear on the mechanical parts, such as in the case of slip rings for data and/or power transfer.

For example, a first inductive member is arranged on the base and a second inductive member is arranged on the support such that power can be transferred by inductive coupling between the first and the second inductive member, particularly wherein the inductive members are embodied as inductive coils, and/or a first optical communication device is arranged on the base and a second optical communication device is arranged on the support such that data can be transferred between the first and the second optical communication device in a unidirectional or bidirectional way by wireless optical communication, particularly wherein the optical communication devices are embodied as optical transceivers.

According to another embodiment, the surveillance system further comprises a multispectral imaging unit configured for generating imaging data of the monitored infrastructure, wherein the classification is based on the imaging data. For example, the multispectral imaging unit comprises at least one of a visual imaging camera, e.g. a RGB image camera, and a thermal imaging camera, e.g. operating in a wavelength range of 8 μm to 15 μm.

In particular, the computing unit may be configured to process the imaging data and the measurement data for generating a colored 3D point cloud of the monitored infrastructure.

On the one hand, the use of multispectral imaging provides for an improved representation of the monitored infrastructure for a human observer. On the other hand, multispectral imaging allows access to details which are otherwise hidden to the human eye or the LiDAR device. In particular, multispectral imaging provides the object detector with color and/or temperature information.

In a further embodiment, the surveillance system comprises a display unit configured for displaying at least one of the colored 3D point cloud, and an image stream based on the imaging data, e.g. a real time video stream. In particular, the displaying may be configured to provide access to at least one of temperature information determined from the imaging data, particularly wherein the temperature information is provided by color coding, and information on the classification of the object, e.g. a determined size parameter such as a cross section and/or a volume of the object, an object class, and/or a threat level provoked by the object.

In another embodiment, the display unit comprises a multitude of displays of different areas of the monitored infrastructure, wherein the surveillance system is configured for highlighting one of the displays based on the classification. Thus, the system may automatically bring the most relevant view of the infrastructure to the attention of a human operator, e.g. providing for an improved overview of many separated surveillance monitors showing different views and/or for an improved selection of many selectable, e.g. stacked, views within the same monitor.

Advantageously, the LiDAR device and the multi spectral imaging unit are arranged on the same common sensor platform, e.g. in order to provide simplified mounting and distribution of a multitude of such hybrid surveilling devices within the environment to be monitored.

Accordingly, in a further embodiment the base is embodied as a common sensor platform for the LiDAR device and for the multispectral imaging unit, wherein the cameras of the multispectral imaging unit are arranged on the base on a circumferential area around the cover of the LiDAR device.

In particular, the LiDAR device comprises a battery configured to power the LiDAR device and/or the multispectral imaging unit, particularly wherein the battery is configured as backup battery for the case of failure of a main power supply. Therefore, the surveying sensors are self-sufficient, at least for a while, e.g. in case an intruder tries to interfere with the surveillance system by means of cutting the power supply.

For example, the multispectral imaging unit comprises two visual imaging cameras having different viewing directions from each other, wherein each of the two visual imaging cameras has a field of view of at least 180 degrees, and the two visual cameras are placed on a circumference around the cover of the LiDAR device with an angular separation of 150 to 180 degrees and have the same distance from the circumference center, and/or the multispectral imaging unit comprises four thermal imaging cameras having different viewing directions from each other, wherein each of the four thermal imaging cameras has a field of view of at least 80 degrees, and the four thermal imaging cameras are placed on a circumference around the cover of the LiDAR device with a uniform angular separation and have the same distance from the circumference center.

According to another embodiment, the object detector is configured that classification is based on determining a deviation of the 3D point cloud from a 3D background model, particularly wherein the system is configured for generating the 3D background model based on the measurement data, e.g. wherein the system is configured for storing time-stamped point clouds generated from the measurement data and to use one of the time-stamped point clouds as the 3D background model.

For example, thanks to the LiDAR arrangement according to the invention, i.e. the swiveling of the LiDAR target axis about two essentially orthogonal axes, the inventive surveillance system may generate an actual high resolution 3D model of the monitored infrastructure. Thus, the inventive system is able to detect essentially static changes in the environment, e.g. temporarily installed market stalls or construction sites, and to consider an actual condition of the monitored infrastructure in recognizing objects brought into the environment to be monitored.

In particular, the availability of a currently valid high-resolution background model as reference improves the detection of left behind items. Often prior art surveillance systems require an object to be moving in order to detect the object. However, particularly in crowded areas with many object movements, the initial bringing of an object and the placement of the object within the monitored environment may have gone unnoticed, e.g. because of line-of-sight blocking, wherein the now static object cannot be detected anymore by the state-of-the-art surveillance system. However, by using a currently valid background model and a LiDAR arrangement according to the invention static left behind objects can still be detected by comparison of a current 3D point cloud against the background.

For example, the surveillance system may be configured for considering referencing data for generating the 3D background model, wherein the referencing data are indicative of at least one of a reference period, e.g. a rest period, of the monitored infrastructure, recurring changes, particularly regularly recurring changes, of the monitored infrastructure, topological information for the monitored infrastructure that can be associated to respective point cloud areas, e.g. provided by a digital 2D floorplan and/or a digital 3D map, a functional relationship between different areas of the monitored infrastructure that can be associated to respective point cloud areas, and an object moving within the monitored infrastructure, particularly provided by geometric and/or semantic classification parameters of an associated object classification model.

Thus, in case the infrastructure to be monitored has regular closing times or rest periods, e.g. a subway station which is closed during night, a current 3D background model may be generated on a regular basis triggered by the closing times.

In case of a roundabout operation of the infrastructure to be monitored and/or in case more frequent generation of a 3D background model is required, the system may further be configured for generating the 3D background model based on pattern and/or object recognition in order to differentiate between the background and objects moving within the monitored environment.

For example, the system may be configured for carrying out a so-called dynamic referencing procedure, wherein a multitude of time-stamped point clouds are generated based on the measurement data and stored on the computing unit, rest areas are identified within the multitude of time-stamped point clouds, the rest areas being parts of the point cloud which do not change over the extent of time associated to the multitude of time-stamped point clouds, and the 3D background model is based on the rest areas, e.g. wherein the 3D background model is generated to be free of objects moving in the monitored infrastructure.

In a further embodiment, the classification is based on at least one of a temperature determined for the object; a geometrical (e.g. 2D or 3D) shape and/or size determined for the object; a movement pattern determined for the object; a velocity and/or acceleration determined for the object, e.g. wherein zero velocity and/or a velocity above a velocity threshold are classification criteria associated to a criticality class of the classification; and recognition of the object as a physical item and recognition of a further object as a person associated with the physical item, and making use of a logical relationship of the movement of the person with respect to the physical item.

Thanks to classification based on 3D information, a variety of different objects can be recognized and associated to each other. For example, the system is able to recognize a person initially carrying a suitcase, wherein the person may leave the suitcase behind for a while, e.g. to buy something at a newsstand or to go to the rest room, without raising an alarm by the system. However, the system may raise an alarm or trigger any other action in case the person does not return to the suitcase or in case another person picks up the suitcase while the initial owner is out of sight.

Using a two-axis LiDAR arrangement according to the invention also has the benefit that the monitored infrastructure can be partitioned into different subsections being subject to different monitoring and/or alarming criteria (similar to geofencing), wherein a change of these subsections and/or a new definition of a subsection does not require mechanical adjustment or relocation of the surveying sensors. For example, restriction zones where objects are not allowed to enter may evolve over time, e.g. wherein a new temporary restriction zone may be created around a temporary construction site, e.g. an open manhole cover, or wherein a particular building sector needs increased security because of a temporary event such as the visit of a famous political leader.

Thus, in a further embodiment, the surveillance system is configured that the classification is based on determining a relative position and/or movement of the object within the 3D point cloud with respect to a virtual boundary within the 3D point cloud. In particular, the surveillance system is configured that the virtual boundary is freely definable and/or adaptable by an operator of the surveillance system.

The classification based on the measurement data of the two-axis LiDAR arrangement, i.e. essentially intrinsically providing a high-resolution 3D measurement of the environment and the object, may also be beneficial for supporting operation of a facility such as a warehouse or a car park since essentially direct measurement of the geometrical shape and size of the object and parts of the monitored infrastructure is possible.

Accordingly, according to a further embodiment, the surveillance system is configured for assigning to the object a target location based on the classification, particularly wherein the classification is indicative of a geometrical shape parameter of the object and wherein the assigning is based on a space requirement of the object. More particularly, the assigning is based on an optimization parameter for the placement of multiple objects of different shape and/or size within the monitored infrastructure.

By way of example, the system may be configured to determine at least one of width, length, and height of the object, and to assign the object to one of a set of appropriate predefined target locations, e.g. wherein target locations have a known shape and size.

By way of another example, further optimization of the shape and size of the object with respect to the target location may be provided by also determining a currently available space condition, e.g. a shape and size, of different target locations, e.g. depending on objects already placed in neighboring locations.

Thus, in a further embodiment, the surveillance system is configured for determining the target location to be assigned to the object based on the measurement data.

In particular, the surveillance system is configured for providing guidance data for guiding the object to the target location based on the measurement data, e.g. wherein the guidance data are configured to activate a signalization to be followed by a human operator and/or wherein the guidance data are configured to control movement of the object, e.g. wherein the object is a car having autonomous driving functionality.

In prior art, many algorithms for providing classification and for determining functional relationships between objects based on 3D data are known.

By way of example, the classification is implemented with at least one of a rule-based system, based on expert knowledge, in particular comprising a decision tree, a Bayesian a decision network, first-order logic, temporal logic and/or a state model with hidden states, a fuzzy logic system, an energy optimization based system, a rough set based system, a hierarchical decision system, a multi agent system, a data-based system, based on previous generated states and/or state patterns, in particular comprising a decision tree, an ensemble of decision trees, a rule-based machine learning system, an energy optimisation based system, a generative or discriminative probabilistic graphical model in particular comprising a Bayesian network, a Markov random field, a conditional random field, a restricted Boltzmann machine; a fuzzy logic system, a neural network, in particular a deep neural network, in particular a recurrent neural network or a generative adversarial network, a case-based reasoning based system, an instance-based learning system in particular using the k-nearest neighbour method, a kernel method, a system using supervised or unsupervised clustering, a neuro-fuzzy system, a collective classification and/or collective regression based system.

Some aspects of the invention further relate to a hybrid 3D-surveying device for detecting an object within an infrastructure, particularly a building or facility, more particularly an area that is frequently exposed to people and/or vehicles passing through, comprising a common base for a LiDAR device and for a multispectral imaging unit of a surveillance system according to any one of the embodiments described above, wherein the cameras of the multispectral imaging unit are arranged on the common base on a circumferential area around the cover of the LiDAR device.

In a particular embodiment of the hybrid 3D-surveying device the multispectral imaging unit comprises two visual imaging cameras having different viewing directions from each other, wherein each of the two visual imaging cameras has a field of view of at least 180 degrees, and the two visual cameras are placed on a circumference around the cover of the LiDAR device with an angular separation of 150 to 180 degrees and have the same distance from the circumference center, and/or the multispectral imaging unit comprises four thermal imaging cameras having different viewing directions from each other, wherein each of the four thermal imaging cameras has a field of view of at least 80 degrees, and the four thermal imaging cameras are placed on a circumference around the cover of the LiDAR device with a uniform angular separation and have the same distance from the circumference center.

BRIEF DESCRIPTION OF THE DRAWINGS

The surveillance system and the hybrid 3D-surveying device according to the invention are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
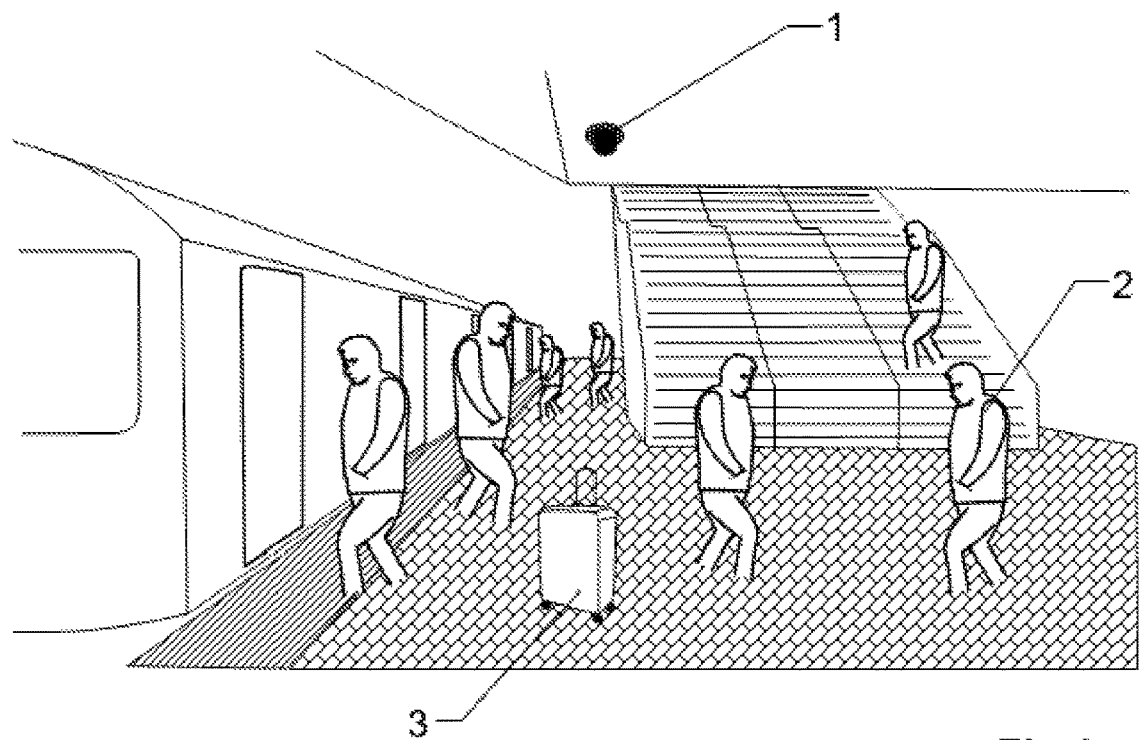
FIG. 1: an exemplary field of application for the inventive surveying system, here the surveying of a subway station.

FIG. 1 shows an exemplary field of application for the inventive surveying system in a crowded area, here a subway station, wherein typically a multitude of surveying devices 1, e.g. a LiDAR device or a hybrid 3D-surveying device according to any one of the embodiments described above, are distributed within the infrastructure in order to provide full coverage with a minimum of blind spots.

A multitude of objects 2, e.g. pedestrians, trains, subway passengers, and marketers, are moving within the area, wherein the inventive surveying system is particularly configured for automatically tracking the moving objects 2 and for automatically detecting a left behind object 3, e.g. a suitcase which could potentially comprise harmful substances or explosives.

Figure 2:
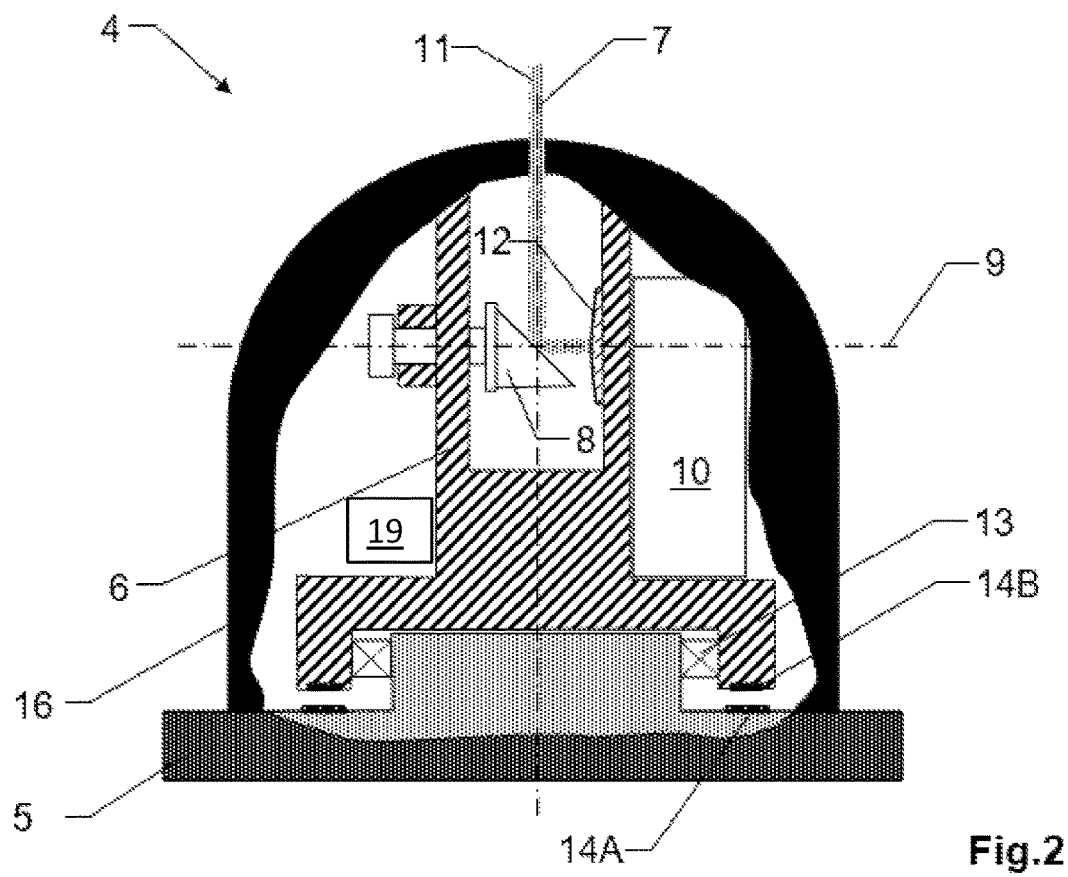
FIG. 2: an exemplary embodiment of a LiDAR device according to the invention.

FIG. 2 shows an exemplary embodiment of a LiDAR device 4 according to the invention. The LiDAR device comprises a base 5 and a support 6, wherein the support 6 is mounted on the base 5 such that it is rotatable about a first rotational axis 7, often referred to as the slow rotation axis. A rotary body 8 is mounted on the support 6 such that it is rotatable about a second rotational axis 9 being substantially orthogonal to the first rotational axis 7, often referred to as the fast axis since the rotation of the rotary body 8 is typically faster than the rotation of the support 6.

The LiDAR device 4 comprises an optical distance measuring device 10, e.g. arranged in the support 6, configured for acquiring distance measurement data, with a transmitter configured for transmitting a measurement signal in the form of a distance measuring radiation 11, e.g. pulsed laser radiation, along a target axis towards a target, and with a receiver configured for detecting at least part of the distance measuring radiation 11 returning from the target, e.g. by means of an objective 12 and a light-sensitive sensor configured for measuring the time-of-flight of laser pulses, such that based on the time of flight, and particularly the shape, and/or the phase of a received laser pulse, a distance to the target is derived.

The distance measuring radiation 11, also referred to as the transmission radiation, is often transmitted at a wavelength range of the infrared wavelength region and deflected by a mirror surface of the rotary body 8, e.g. a plane mirror surface or a parabolic mirror surface, such that the distance measuring radiation 11 is swiveled about the second rotational axis 9.

The LiDAR device 4 also has an angle determining unit 19 configured for capturing an orientation of the support 6 about the first rotational axis 7 and of the rotary body 8 about the second rotational axis 9, respectively. For example, the amount of rotation of the support 6 about the first rotational axis 7 and the rotary body 8 about the second rotational axis 9, respectively, can be determined by means of angle encoders configured for the acquisition of angular data, wherein the LiDAR device 4 is configured for associating the angular data to corresponding distance measurement data of the distance measuring device 10. Therefore, essentially the entire environment around the LiDAR device 4 can be spatially measured, wherein a desired point-to-point resolution may be set by adjusting the pulse rate of the distance measuring device 10 and/or by adjusting the rotational speed of the rotary body 8 and/or the support 6. A subsequent representation of the data can be based on conventional data processing steps and/or display options, e.g. in order to display the acquired data in the form of a 3D point cloud.

The bearings 13 are configured to be essentially free of clearance in order to minimize tilting of the rotary body 8 and the support 6. Many different kinds of bearing arrangements are known in the prior art. For example, the bearing ring may be formed as a four-point rolling bearing.

In particular, as also indicated in the figure, the LiDAR device 4 may comprise a wireless data and/or power interface for wireless data transfer, for wireless power transfer, or for wireless data and wireless power transfer, respectively, between the base 5 and the support 6, e.g. for avoiding wear on mechanical parts for data and/or power transfer. For example, a first inductive member 14A, e.g. an inductive coil, is arranged on the base 5 and a second inductive member 14B is arranged on the support 6 such that power can be transferred by inductive coupling between the first and the second inductive member 14A,14B.

Similarly, data may be transferred based on optical communication between optical transceivers (not shown) mounted on the base 5 and the support 6, respectively.

Furthermore, the LiDAR device 4 further comprises a cover 16 mounted on the base 5, wherein the base 5 and the cover 16 form an enclosure that encloses all moving parts of the LiDAR device 4, wherein the cover 16 is configured to be opaque for visible light and translucent for the wavelength range of the distance measuring radiation 11.

Figure 3:
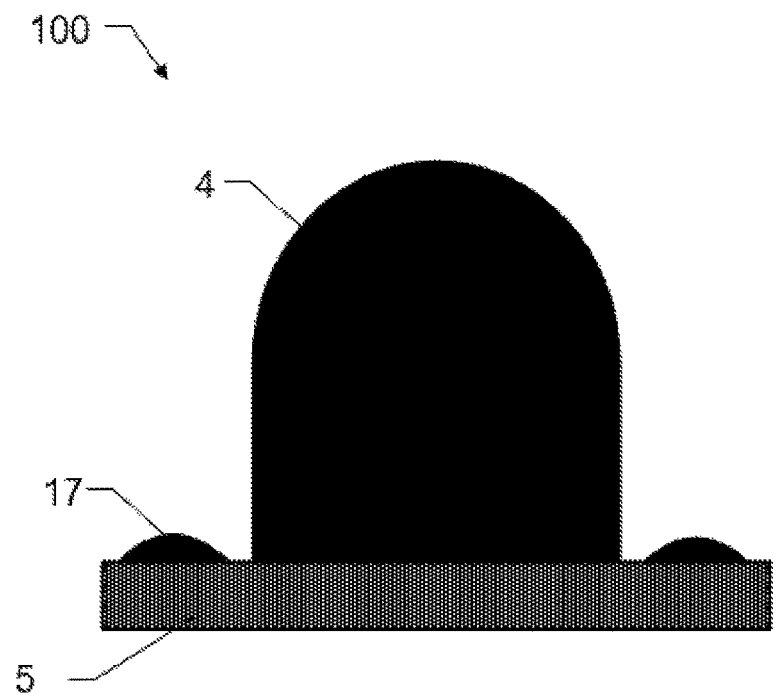
FIG. 3: an exemplary embodiment of a hybrid 3D-surveying device according to the invention.
Figure 3:
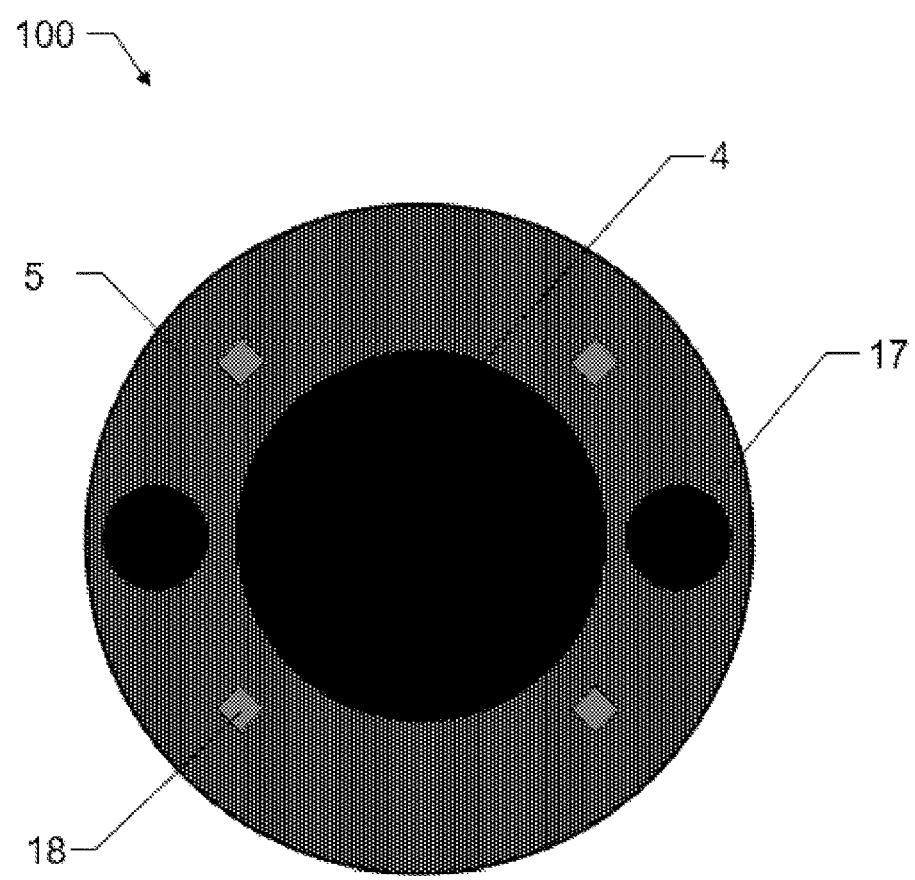

FIG. 3 shows an exemplary embodiment of a hybrid 3D-surveying device 100 usable in a surveying system according to the invention. The top part of the figure shows a side view of the hybrid 3D-surveying device 100 and the bottom part of the figure shows a top view of the hybrid 3D-surveying device 100.

The hybrid 3D-surveying device 100 comprises a LiDAR device 4 as described with respect to FIG. 2, wherein the base 5 is configured as a common sensor platform for the LiDAR device 4 and an additional multispectral imaging unit comprising multispectral cameras arranged on a circumferential area around the cover of the LiDAR device 4.

In the shown example, the multispectral imaging unit comprises two visual imaging cameras 17, each visual camera 17 having a field of view of at least 180 degrees, and four thermal imaging cameras 18, each of the four thermal imaging cameras 18 having a field of view of at least 80 degrees.

The two visual cameras 17 are placed on a circumference around the cover of the LiDAR device 4 with an angular separation of 180 degrees, and the four thermal cameras 18 are placed on a circumference around the cover of the LiDAR device 4 with an angular separation of 45 degrees with respect to each other.

Figure 4:
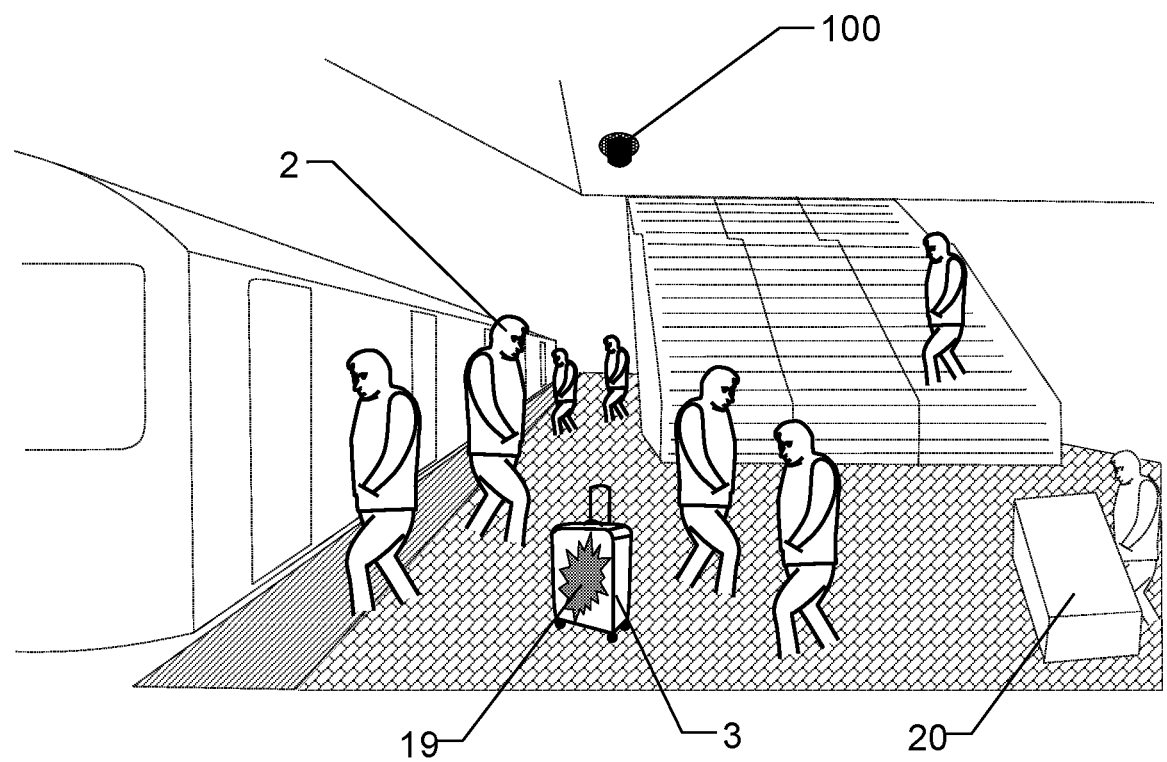
FIG. 4: indicates detection of a left behind object based on recognizing a change in the 3D point cloud by determining a deviation of the 3D point cloud from a frequently updated 3D background model and based on temperature information.

Therefore, as indicated by FIG. 4, the hybrid 3D surveying device 100 provides for detection of a left behind object 3 based on recognizing a change in the 3D point cloud by determining a deviation of the 3D point cloud from a frequently updated 3D background model (indicated by dashed/weak lines), and based on temperature information 19.

In particular, based on data from the hybrid 3D surveying device 100, the inventive system is able to frequently update the background model in order to consider essentially static changes in the environment when determining the deviation from the background model, e.g. a temporarily installed market stall 20, and to both detect moving objects 2 as well as objects 3 where the bringing into the environment has gone unnoticed and which objects are now static.

Figure 5:
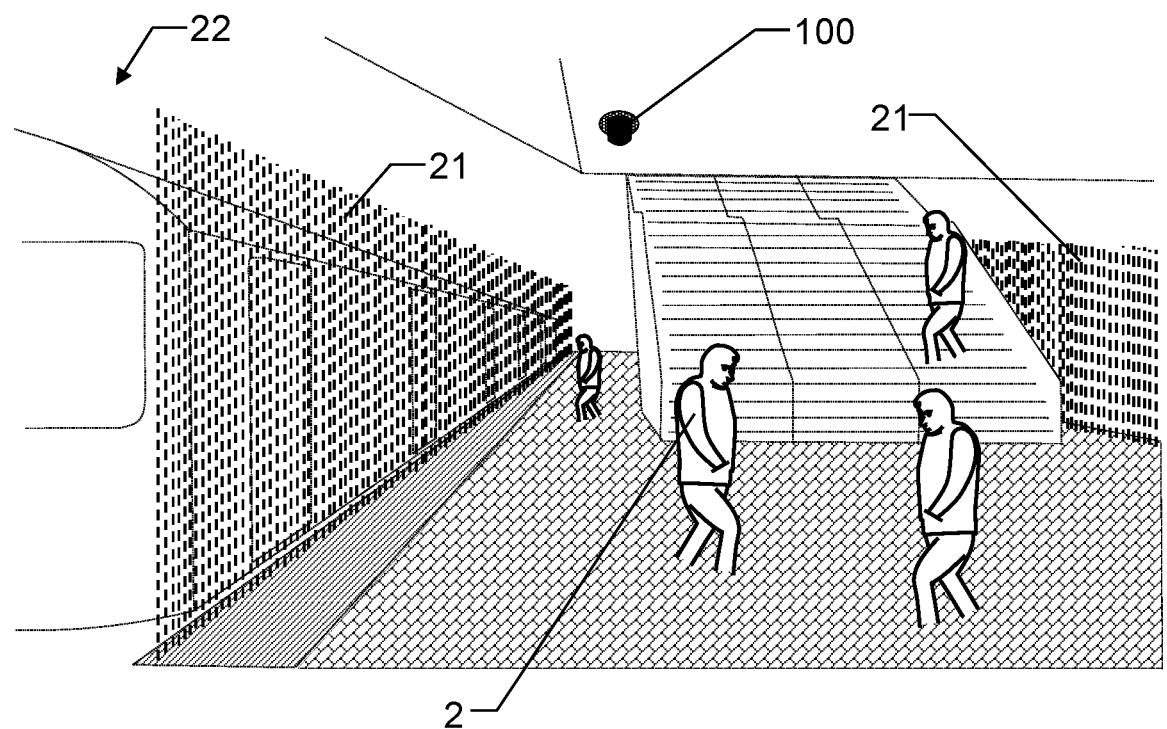
FIG. 5: indicates the use of virtual boundaries within the 3D point cloud.

FIG. 5 indicates the use of virtual boundaries 21 for raising an alarm or any other action similar to the principle of geofencing.

For example, in a subway or railway station passengers 2 are not allowed to enter the track area 22. Thanks to the 3D LiDAR arrangement of the hybrid 3D surveying device 100 virtual boundaries 21, e.g. so-called LiDAR curtains, may be defined within the 3D point cloud, wherein an automatic alarm is raised in case a person 2 or any other object crosses a virtual boundary 21 and/or is located within a restricted area defined by the virtual boundaries 21. Thus, an approaching train may be automatically stopped based on the measurement data of the hybrid 3D surveying device 100.

In particular, the alarm and/or automatic intervention may be triggered based on an analysis of a relative movement of an object 2 with respect to a virtual boundary 21, i.e. not only by a crossing of the boundary 21.

For example, the surveying system may be configured to recognize playing children or that somebody gets pushed or stumbles towards the tracks. In other words, the system is configured to making use of a logical relationship between relative movements of different objects 2 to each other, and between a relative movement of an object 2 with respect to a virtual boundary 21.

Figure 6:
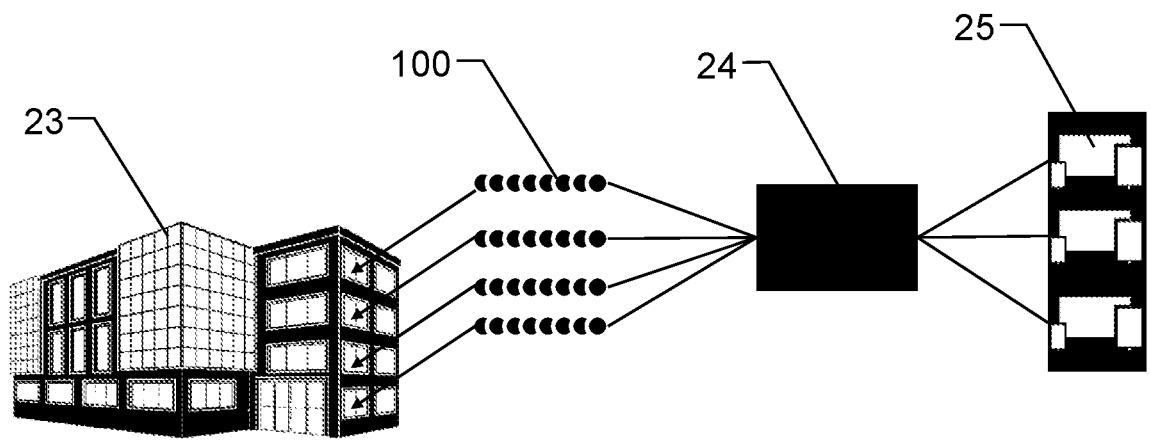
FIG. 6: another exemplary field of application for the inventive surveying system, here the surveying of a business complex.

FIG. 6 shows another exemplary field of application for the inventive surveying system, here for surveying of a business complex 23.

A multitude of 3D surveying sensors, e.g. hybrid 3D surveying devices 100 as described by FIG. 3, is distributed within the business complex 23, wherein the surveillance system is configured for edge computing and AI (artificial intelligence) powered 3D change detection.

The use of edge computing has the benefit that interoperability with existing systems can be simplified. For example, the hybrid 3D surveying devices 100 may be configured for on-device (pre-)processing of the measurement data, so-called "processing at the edge", in order to adapt to limited bandwidth requirements for exchanging data within existing surveying systems. Thus, classification may be executed on a computing unit of the surveying device, wherein, for example, only information on an identified object type, object location, and/or threat level provoked by an object are transmitted as surveying output data of the hybrid 3D surveying device 100.

The surveying output data of the surveying sensors as well as additional reference data are processed in a cloud 24, e.g. for providing geo-referenced notification, automatic tracking data of identified objects, a history of temperature changes, a digital 3D model of the business complex 23 and live RGB image streams of the business complex 23.

In particular, the system is configured for interoperability with existing physical interfaces, e.g. mounts and connectors for placing the surveying sensors, and with existing hosting and sharing infrastructure, such that the data and information from the surveillance system can be provided to a wide range of existing user end devices 25, e.g. surveying monitors, PCs, tablets, and smart phones.

Figure 7:
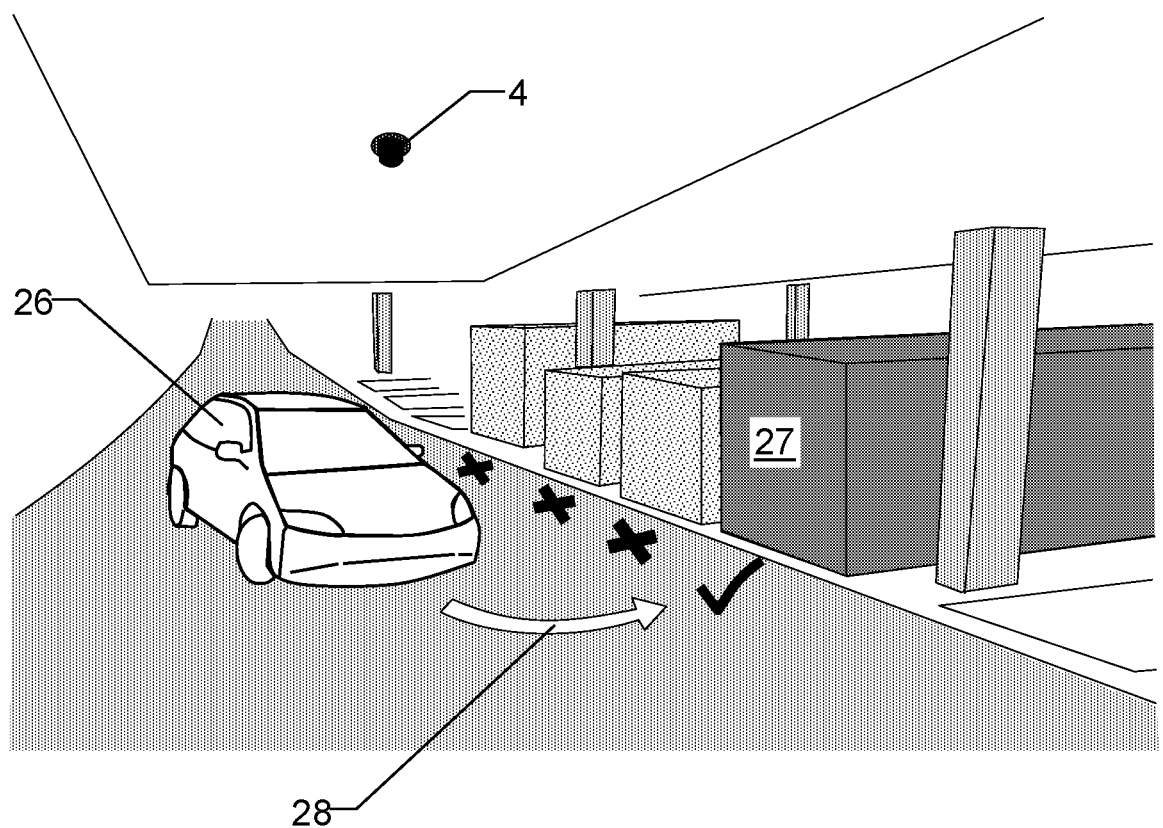
FIG. 7: another exemplary field of application for the inventive surveying system, here the support of a car park.

FIG. 7 shows support of a car park as another exemplary field of application for the inventive surveying system.

The two-axis LiDAR arrangement according to the invention provides a high-resolution 3D measurement of the environment and an object, e.g. a car 26. Therefore, the system can be configured for providing a measurement of the geometrical shape and size of the car 26 and parts of the monitored infrastructure.

By way of example, at the entrance to a car park a first LiDAR device 4 measures geometrical dimensions such as width, length, and height of the car 26, e.g. wherein the system is configured to automatically recognize that a car 26 enters the car park and/or wherein determination of geometrical properties of the car 26 is triggered by an auxiliary system, e.g. wherein the determination of the geometrical properties of the car is triggered by the driver requesting a parking ticket at the gate or triggered by a weight sensor at the entrance.

The surveying system then determines a suitable parking space 27 for the car 26 as a function of its geometrical dimensions and provides guidance data for guiding the car 26 to the parking space 27. For example, the guidance data may be configured to activate a signalization 28 for the driver, e.g. light signals and arrows guiding the driver to the parking space 27. The system may also be configured to take over control of a car 26 having autonomous driving functionality, wherein the movement of the car 26 is controlled based on the measurement data of a network of LiDAR devices 4.

In a simple embodiment of the surveying system, the assignment of a suitable parking space 27 may be based on an available set of differently dimensioned parking spaces, e.g. comprising parking spaces for compact cars, for medium-sized cars, and for full-size cars.

In a more elaborate embodiment, the system is further configured for also measuring the environment for determining geometric dimensions of available parking spaces, i.e. the system is configured for determining a current spatial condition of a set of predefined parking spaces. For example, the system may recognize that a car has been wrongly or sloppily parked such that usability of a neighboring parking space is now reduced. By way of another example, the parking spaces may be freely definable by the system, e.g. based on an optimization parameter for the placement of multiple cars of arbitrary shape and/or size within the area of the car park.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveillance system for detecting an object within a monitored infrastructure, the surveillance system comprising:
  a Light Detection And Ranging (LiDAR) device configured for carrying out a distance measurement by emitting transmission radiation and detecting returning parts of the transmission radiation;
  an object detector configured for detecting an object within the monitored infrastructure based on measurement data of the LiDAR device; and
  a computing unit configured for generating a 3D point cloud of the monitored infrastructure based on the measurement data, wherein the LiDAR device comprises:
a base,
a support mounted on the base such that it is rotatable about a first rotational axis,
a rotary body with a mirror surface, the rotary body being mounted on the support such that it is rotatable about a second rotational axis being substantially orthogonal to the first rotational axis,
an angle determining unit configured for capturing an orientation of the support about the first rotational axis and of the rotary body about the second rotational axis, respectively, and
a cover mounted on the base, the cover being opaque for visible light and translucent for the wavelength range of the transmission radiation, wherein the cover is stationary with respect to the base, and the cover and the base form a closed enclosure of the support and the rotary body,
wherein the LiDAR device is configured to generate the measurement data based on a measurement process including:
a rotation of the support about the first rotational axis,
a rotation of the rotary body about the second rotational axis, and
a transmission of the transmission radiation and a detection of at least parts of the transmission radiation returning via the mirror surface, and
*wherein* the object detector is configured for classification of the object based on the 3D point cloud.

2. The surveillance system according to claim 1, wherein the LiDAR device is further configured to provide for an updating of the 3D point cloud at an update rate of at least one sample point of the 3D point cloud per second per angular field of view of one degree in elevation by one degree in azimuth.

3. The surveillance system according to claim 1, wherein the LiDAR device comprises a wireless data or power interface configured for wireless data transfer, for wireless power transfer, or for wireless data and wireless power transfer, respectively, between the base and the support.

4. The surveillance system according to claim 1, wherein the surveillance system comprises a multispectral imaging unit configured for generating imaging data of the monitored infrastructure, and wherein the classification is based on the imaging data.

5. The surveillance system according to claim 1, wherein the surveillance system further comprises a display unit configured for displaying at least one of:
the 3D point cloud, and
an image stream based on the imaging data.

6. The surveillance system according to claim 5, wherein the display unit further comprises a multitude of displays of different areas of the monitored infrastructure, wherein the surveillance system is configured for highlighting one of the displays based on the classification.

7. The surveillance system according to claim 4, wherein the base is embodied as a common sensor platform for the LiDAR device and for the multispectral imaging unit, wherein the cameras of the multispectral imaging unit are arranged on the base on a circumferential area around the cover.

8. The surveillance system according to claim 1, wherein the object detector is further configured that the classification is based on determining a deviation of the 3D point cloud from a 3D background model.

9. The surveillance system according to claim 1, wherein the classification is based on at least one of:
a temperature determined for the object,
a geometrical shape or size determined for the object,
a movement pattern determined for the object,
a velocity or acceleration determined for the object, and
recognition of the object as a physical item and recognition of a further object as a person associated with the physical item, and making use of a logical relationship of the movement of the person with respect to the physical item.

10. The surveillance system according to claim 1, wherein the surveillance system is configured that the classification is based on determining a relative position or movement of the object within the 3D point cloud with respect to a virtual boundary within the 3D point cloud.

11. The surveillance system according to claim 10, wherein the surveillance system is configured such that the virtual boundary is freely definable or adaptable by an operator of the surveillance system.

12. The surveillance system according to claim 1, wherein the surveillance system is further configured for assigning to the object a target location based on the classification.

13. The surveillance system according to claim 12, wherein the surveillance system is configured for determining the target location to be assigned to the object based on the measurement data.

14. The surveillance system according to claim 12, wherein the surveillance system is configured to provide guidance data for guiding the object to the target location based on the measurement data.

15. A hybrid 3D-surveying device for detecting an object within an infrastructure, the hybrid 3D-surveing device comprises:
a common base for a LiDAR device of a surveillance system according to claim 1, wherein a plurality of cameras of a multispectral imaging unit are arranged on the common base on a circumferential area around the cover of the LiDAR device.

* * * * *